United States Patent [19]
Yamamoto

[11] Patent Number: 6,091,848
[45] Date of Patent: Jul. 18, 2000

[54] COLOR BALANCE ADJUSTING DEVICE AND IMAGE READING DEVICE

[75] Inventor: Yasuhiro Yamamoto, Tokyo, Japan

[73] Assignee: Asahi Kogaku Kogyo Kabushiki Kaisha, Tokyo, Japan

[21] Appl. No.: 09/095,839

[22] Filed: Jun. 11, 1998

[30] Foreign Application Priority Data

Jun. 12, 1997 [JP] Japan ................................ 9-170970

[51] Int. Cl.[7] .............................. H04N 1/46; G06F 15/00
[52] U.S. Cl. ........................................... 382/162; 358/520
[58] Field of Search .................................. 358/520, 518, 358/530, 515; 382/162, 167; 348/655

[56] References Cited

U.S. PATENT DOCUMENTS

| | | | |
|---|---|---|---|
| 4,410,908 | 10/1983 | Sarabia et al. | 358/30 |
| 4,639,881 | 1/1987 | Zingher | 345/173 |
| 4,951,134 | 8/1990 | Nakashima et al. | 358/98 |
| 5,132,825 | 7/1992 | Miyadera | 359/85 |
| 5,488,492 | 1/1996 | Abe | 358/518 |
| 5,801,773 | 9/1998 | Ikeda | 348/229 |

*Primary Examiner*—Jerome Grant, II
*Attorney, Agent, or Firm*—Greenblum & Bernstein, P.L.C.

[57] ABSTRACT

The color balance adjusting device comprises a button, indicated on a surface of a display device, which can be moved rightward and leftward on the surface, by dragging a mouse. In accordance with the displacement of the button, gains of a green component signal and a blue component signal are changed. When the button is positioned to the right of the center, a scene mode is set so that a blue component in the image is emphasized. Conversely, when the button is positioned to the left of the center, a people mode is set so that the blue component in the image is de-emphasized. By only moving the button, the color balance of the image is changed, and thus the operation is simplified.

15 Claims, 10 Drawing Sheets

COLOR BALANCE ADJUSTING DEVICE AND IMAGE READING DEVICE

BACKGROUND OF THE INVENTION

1. Field of the Invention

The present invention relates to an image reading device in which an image, recorded in a film, for example, is irradiated with a light beam and the image is read using a line sensor.

2. Description of the Related Art

Conventionally, there is known an image reading device in which a film is intermittently moved in a direction perpendicular to a longitudinal direction of a line sensor, so that a color image is read line by line. Namely, while the film is stopped, a light beam outputted from a light source illuminates the film, so that one line image is sensed by the line sensor. After this sensing operation, the film is moved by a predetermined amount by a moving mechanism. The sensing operation and the movement are repeatedly carried out, so that one frame image is read.

In such a reading operation by the line sensor, first, the image is pre-scanned with a coarse pitch, and then, the color image obtained by the pre-scanning operation is indicated on a surface of a display device. The user can adjust, while viewing the color image on the display, gains relating to red, green and blue components, so that the color balance of the color image is changed in accordance with the preference of the user.

However, since a skill, to some extent, is required to adjust the color components, it is difficult to obtain a color image having a desired color balance with a simple adjustment.

SUMMARY OF THE INVENTION

Therefore, an object of the present invention is to provide a color balance adjusting device, by which a color balance adjustment is easily performed, and to provide an image reading device, in which the color balance adjusting device is mounted.

According to the present invention, there is provided a color balance adjusting device, by which a color balance of a color image, which is obtained by combining at least a first color component signal and a second color component signal, is adjusted, the device comprising a color component adjusting processor and a control processor.

The color component adjusting processor adjusts a chromaticity of each of the first and second color component signals. The control processor controls the color component adjusting processor in one of a first color balance mode, in which the chromaticity of the first color component signal is increased in comparison with the chromaticity of the second color component signal, and a second color balance mode, in which the chromaticity of the first color component signal is decreased in comparison with the chromaticity of the second color component signal.

Further, according to the present invention, there is provided a color balance adjusting device, by which a color balance of a color image is adjusted, the device comprising a selection processor. The selection processor selects one of a first color balance mode, in which a chromaticity of a first color component signal is emphasized and a chromaticity of a second color component signal is de-emphasized, and a second color balance mode, in which a chromaticity of the first color component signal is de-emphasized and the chromaticity of a second color component signal is emphasized.

Furthermore, according to the present invention, there is provided an image reading device, comprising an optical sensor, a color component adjusting processor and an image indicating processor.

The optical sensor senses a first color image and outputs first and second color component signals. The color component adjusting processor adjusts a chromaticity of each of the first and second color component signals of the first color image. The image indicating processor indicates a second color image obtained based on the first and second color component signals, which are adjusted by the color component adjusting processor. The color component adjusting processor selects one of a first color balance mode, in which the chromaticity of the first color component signal is increased in comparison with the chromaticity of the second color component signal, and a second color balance mode, in which the chromaticity of the first color component signal is decreased in comparison with the chromaticity of the second color component signal.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
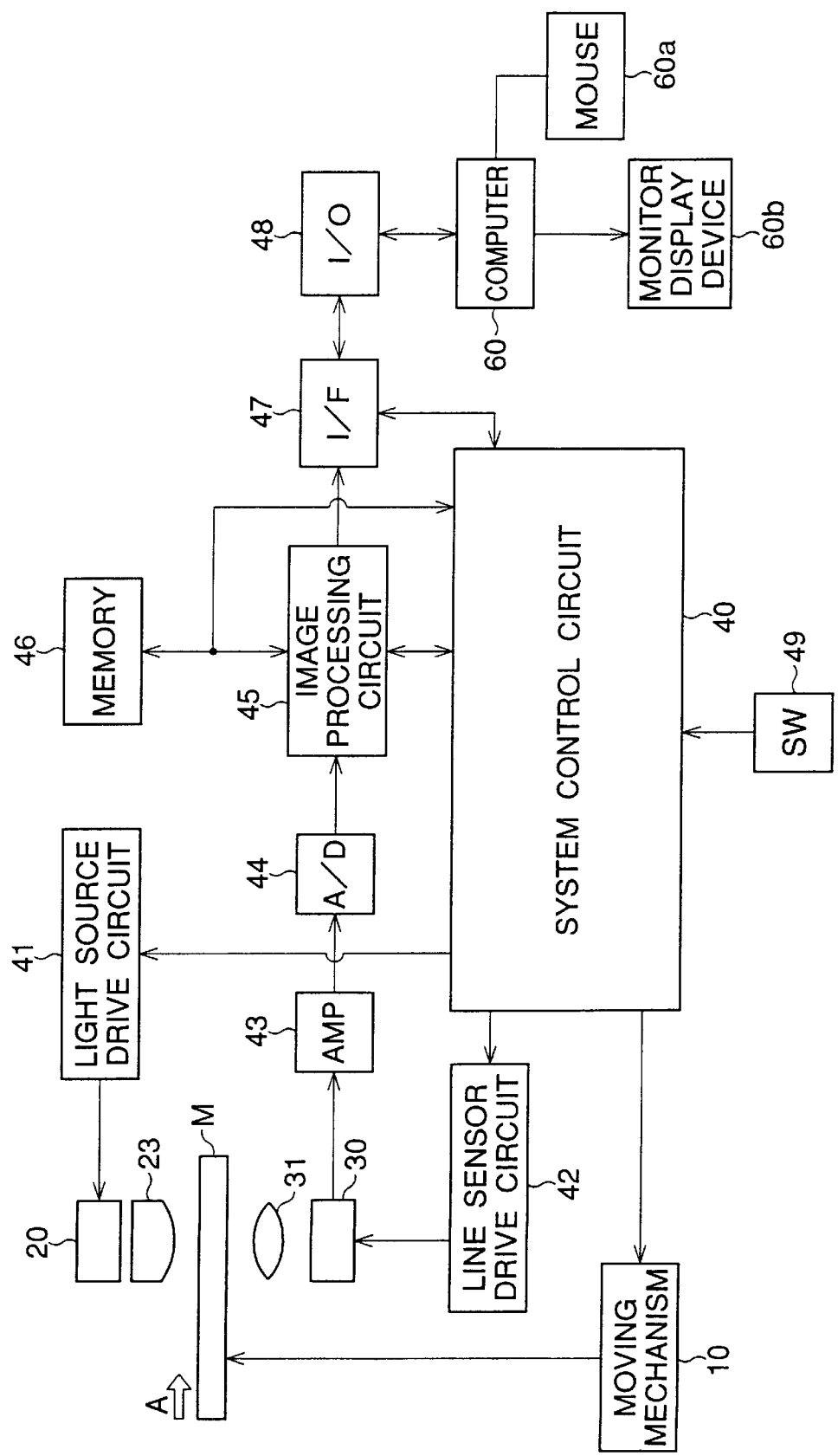
FIG. 1 is a block diagram showing an image reading device, in which a color balance adjusting device of an embodiment of the present invention is mounted.

The present invention will be described below with reference to the embodiment shown in the drawings.

FIG. 1 shows an electrical structure of an image reading device, in which a color balance adjusting device of an embodiment of the present invention is mounted.

A read object M, handled by this image reading device, is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital pixel data is subjected to an image process, such as a shading correction, in an image processing circuit 45, and is then stored in a memory 46.

The image data, subsequent to being read from the memory 46, is subjected to correction processes, such as a color correction and a gamma correction. Then, the image data is converted to a signal, which conforms to a predetermined format, by an interface circuit 47, and is outputted to an external computer 60 through an input/output terminal 48. A mouse 60a and a monitor display device 60b are connected to the external computer 60. The image processing circuit 45 and the interface circuit 47 are controlled by the system control circuit 40. Thus, the color image can be indicated on a surface of the monitor display device 60b through the interface circuit 47, the input/output terminal 48 and the external computer 60. Further, the image reading device can be controlled through the external computer 60, the input/output terminal 48 and the interface circuit 47, by handling the mouse 60a.

In this embodiment, although each of the operations can be controlled by the external computer 60, a switch 49 may be connected to the system control circuit 40, so that various operations can be directly performed, such as reading the image recorded on the film M, for example.

Figure 2:
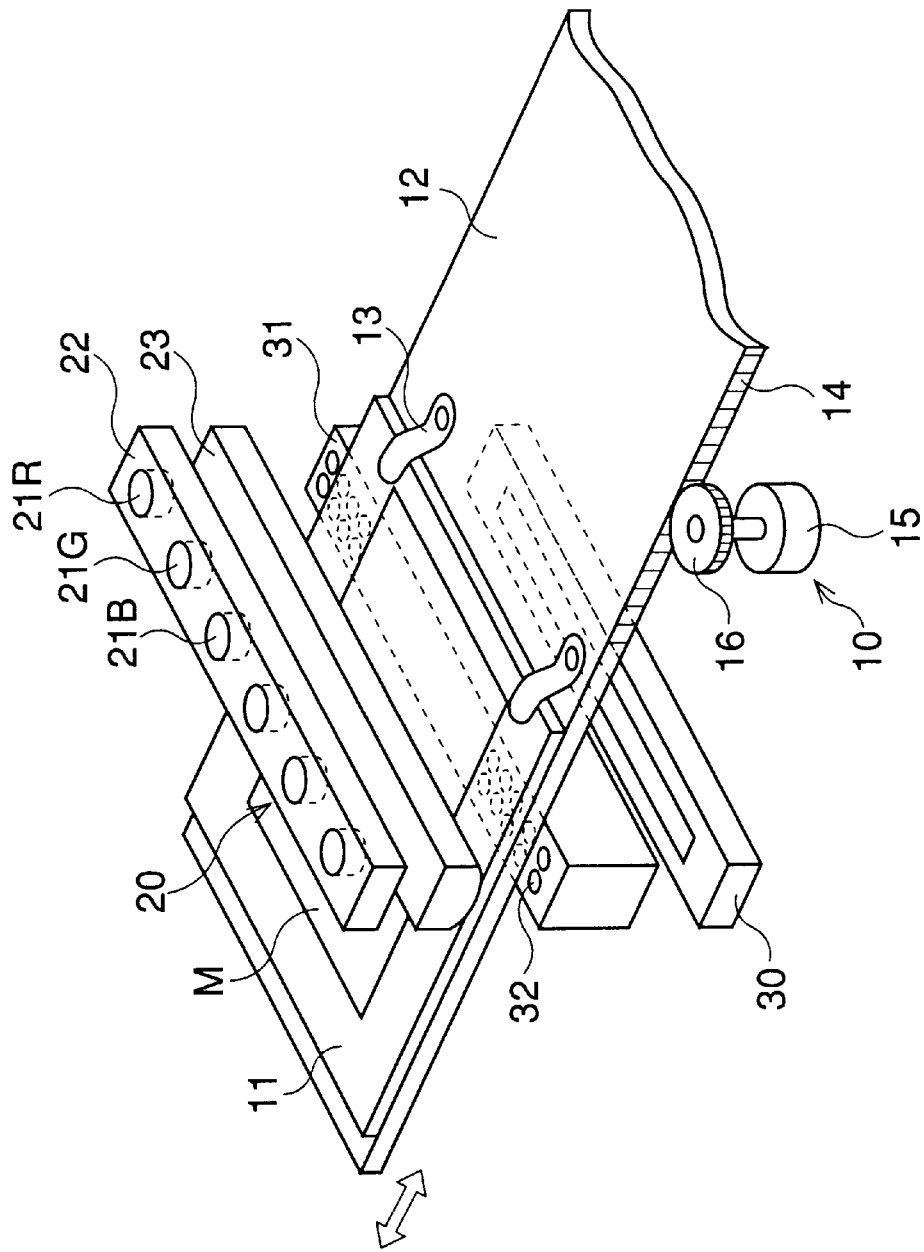
FIG. 2 is a perspective view showing a moving mechanism, a light source and a line sensor.

FIG. 2 shows the moving mechanism 10, the light source 20 and the line sensor 30. The film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the film M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
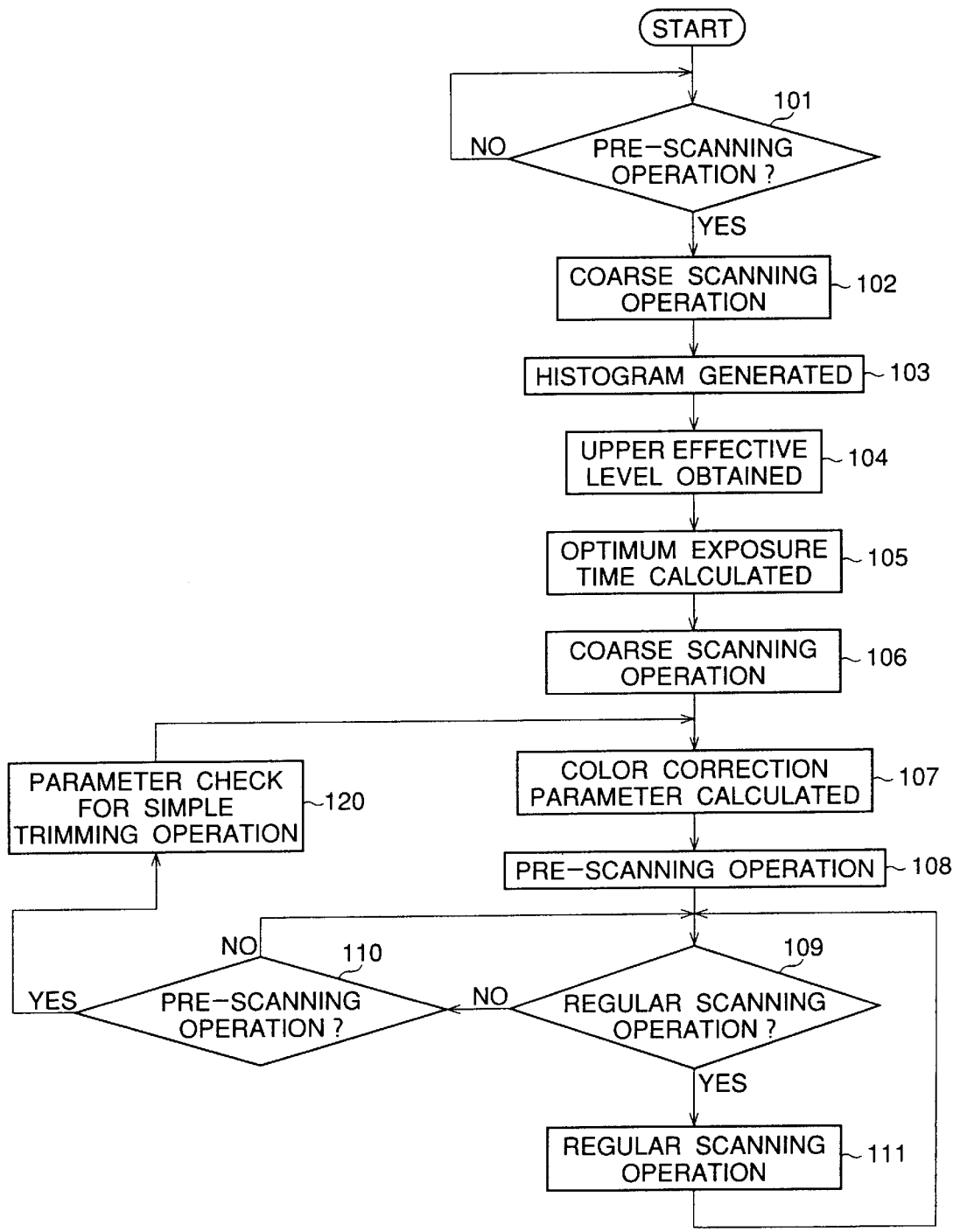
FIG. 3 is a flowchart of an image reading routine executed in the image reading device.
Figure 4:
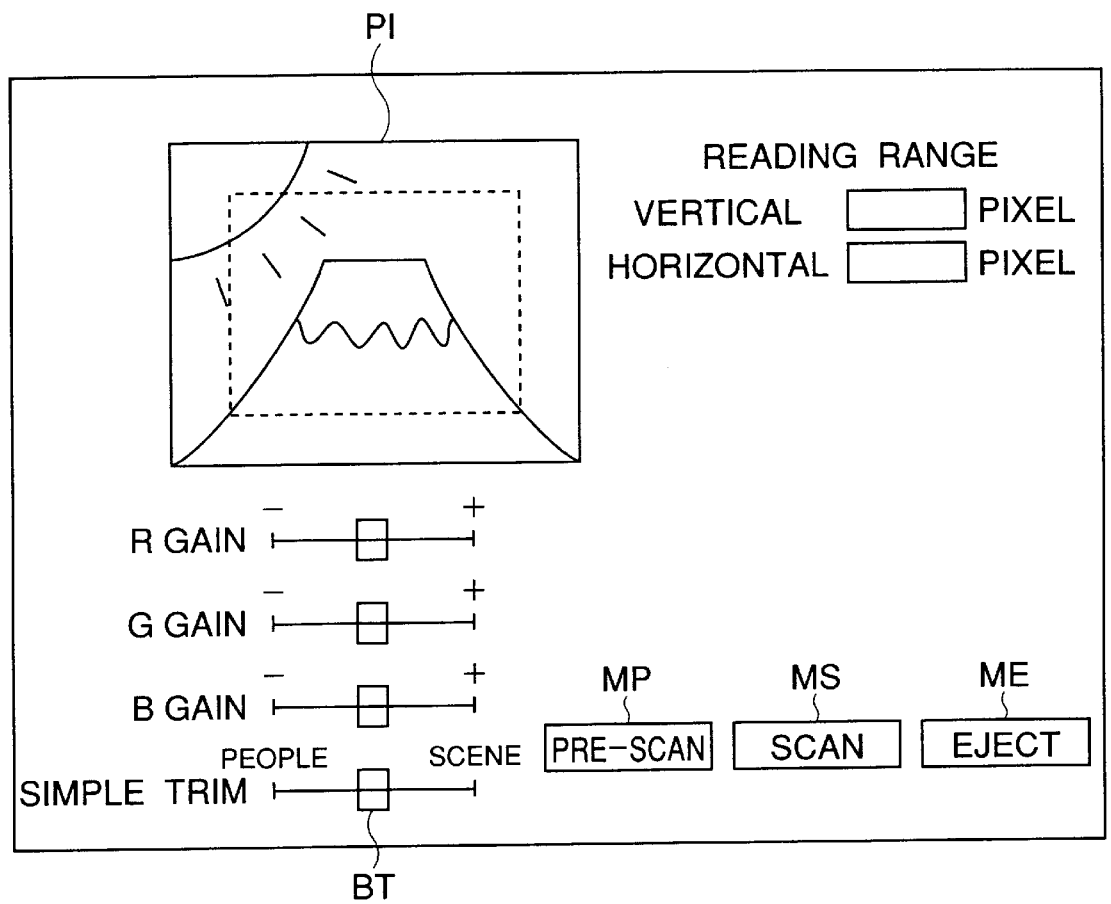
FIG. 4 is a view showing an example of a surface of the display device of the computer.
Figure 5:
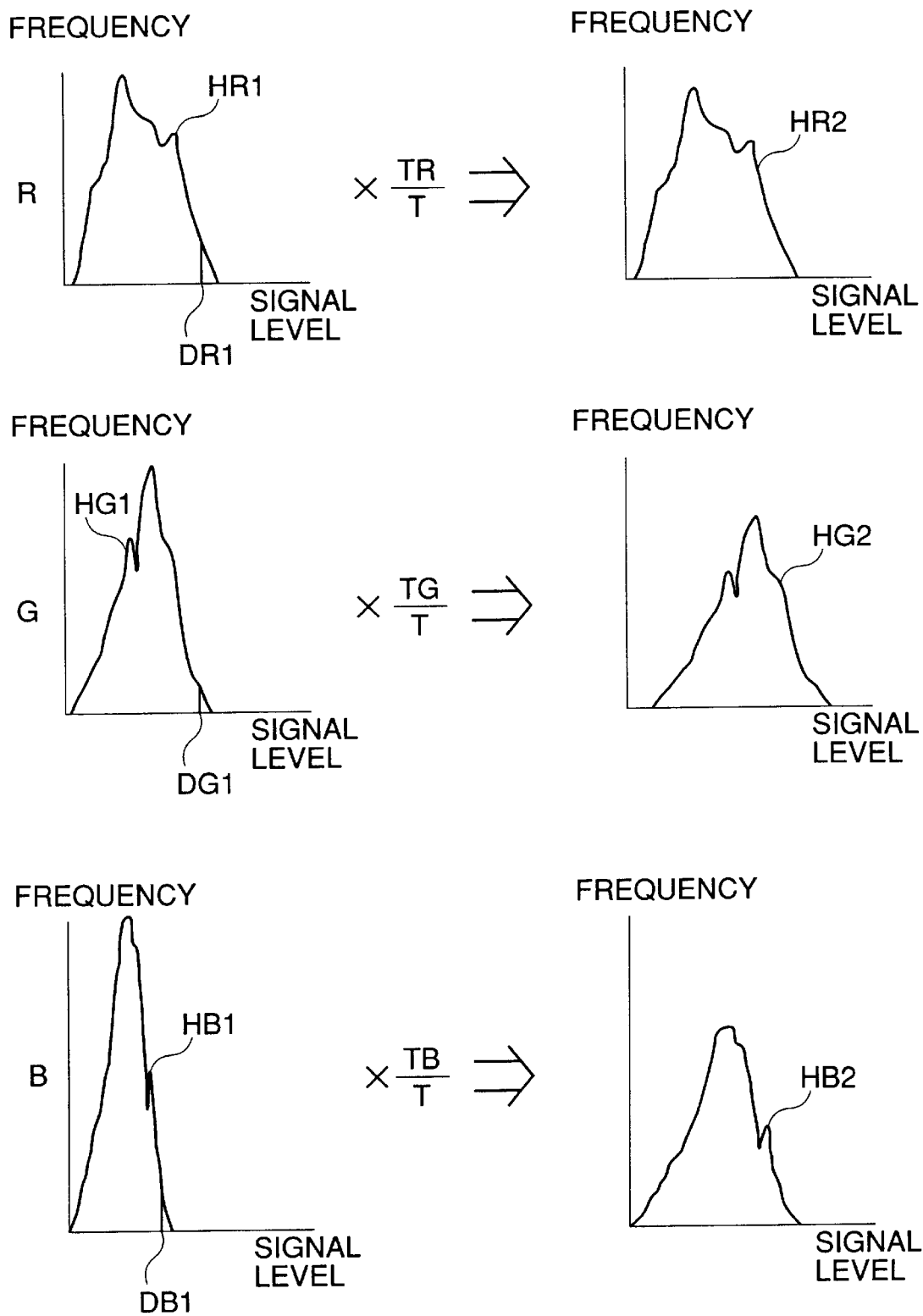
FIG. 5 shows histograms generated based on image data obtained in a coarse scanning operation executed in Step 102 of FIG. 3.
Figure 6:
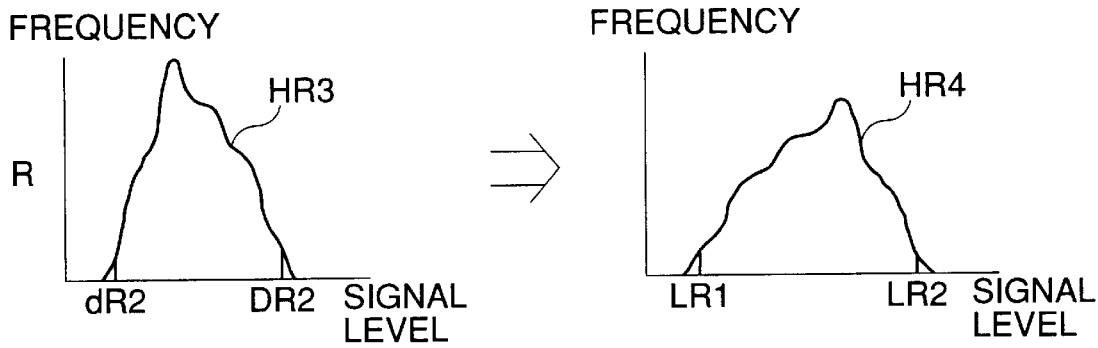
FIG. 6 shows histograms generated based on image data obtained in a coarse scanning operation executed in Step 106 of FIG. 3.
Figure 6:
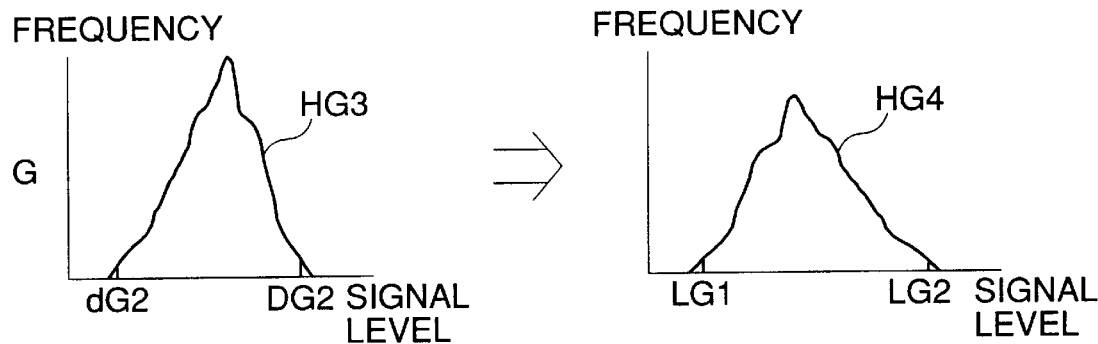
Figure 6:
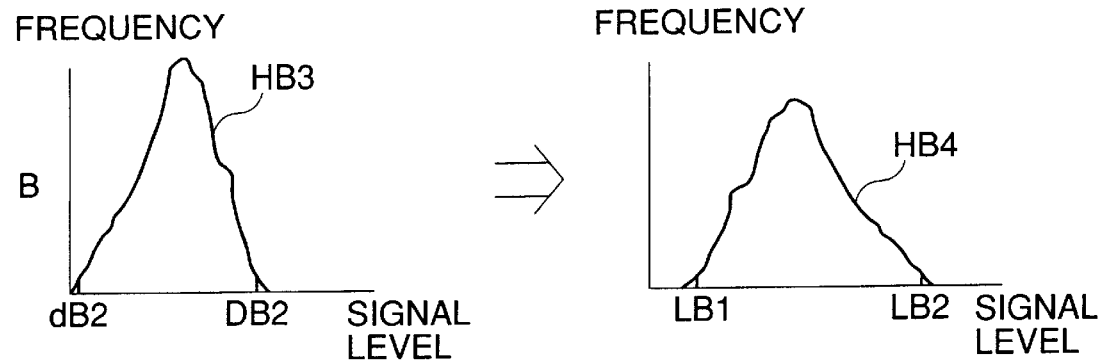

FIG. 3 is a flowchart of an image reading routine executed in the image reading device. FIG. 4 shows an example of a surface of the monitor display device 60b of the computer 60. FIGS. 5 and 6 show histograms generated based on image data obtained by the coarse scanning operations in Steps 102 and 106, respectively. With reference to these drawings, an operation of the image reading device is described below. Note that the operation of the image reading device is controlled by clicking a predetermined label indicated on the surface of the monitor display device 60b, using the mouse 60a, for example.

In step 101, it is determined whether or not a pre-scanning operation is to be performed. A label "MP", denoting the pre-scanning operation and indicated on the surface of the monitor display device 60b, is clicked and the process goes from Step 101 to Step 102, so that a coarse scanning operation, i.e. an exposure measurement, is carried out. Namely, while the light source 20 is turned ON, the film M is intermittently moved, via the moving mechanism 10, with a coarser pitch than that of a regular scanning operation performed in Step 111. During the intermittent movement, the line sensor 30 is exposed for a predetermined exposure time T, so that image data of one frame image is detected. Note that, in the coarse scanning operation, the light source 20 is controlled in such a manner that the light-emitting diodes 21R, 21G and 21B are illuminated in a predetermined order every time the stage 12 is stopped, so that R, G and B image data are obtained.

In Step 103, a histogram representing a distribution of signal levels is generated for each of the R, G and B image data obtained in Step 102. Namely, as shown in FIG. 5, an R-histogram HR1, a G-histogram HG1 and a B-histogram HB1 are obtained. In Step 104, regarding each of the color components R, G and B, upper effective levels DR1, DG1, DB1 are obtained, each of which is a value that is less than the maximum value of the histogram by a predetermined amount. The upper effective level corresponds to a signal level which is obtained as follows: the highest frequency signal levels included in the histogram are summed, and when the sum reaches 0.5%, for example, of the total sum of all of the frequencies included in the histogram, the boundary signal level is the upper effective level.

In Step 105, based on the exposure time T from the execution of Step 102, the upper effective levels DR1, DG1 and DB1 obtained in Step 104, and a predetermined value PRD ("1023", for example, representing 10-bit data), an optimum exposure time is calculated for each of the color components. The optimum exposure time TR regarding the red component is:

$$TR = (PRD/DR1) \times T$$

The optimum exposure time TG regarding the green component is:

$$TG=(PRD/DG1) \times T$$

The optimum exposure time TB regarding the blue component is:

$$TB=(PRD/DB1) \times T$$

In the histograms HR1, HG1 and HB1, shown on the left side of FIG. 5, by multiplying each of the signal levels (abscissa of the histogram) by a coefficient (TR/T), (TG/T) and (TB/T), respectively, second histograms HR2, HG2 and HB2, shown on the right side of FIG. 5, are obtained. Namely, the second histograms HR2, HG2 and HB2 are estimations of histograms that would be obtained if an image were to be read using the optimum exposure time. However, actually, histograms slightly different from the second histograms would be obtained. Namely, when a coarse scanning operation is again performed in Step 106, using the optimum exposure times TR, TG and TB, third histograms HR3, HG3 and HB3, shown on the left side of FIG. 6, are obtained.

In Step 107, regarding the third histogram HR3, an upper effective level DR2 and a lower effective level dR2 are obtained. The same procedure as that executed in Step 104 is utilized to obtain the upper effective level DR2. The lower effective level dR2 is a value which is greater than the minimum value of the histogram by a predetermined amount. Then, this histogram HR3 undergoes left-right inversion, in such a manner that the upper effective level DR2 coincides with a lower reference value LR1 of a look-up table and the lower effective level dR2 coincides with an upper reference value LR2 of the look-up table. Thus, a linear-reversal gradation correction is performed, and a fourth histogram HR4 is obtained. Note that the look-up table is referred to when a gamma correction is performed to image data in the pre-scanning operation and the regular scanning operation, as described later.

In a similar way, regarding the histogram HG3, the upper effective level DG2 and the lower effective level dG2 are obtained. Then, the linear-reversal gradation correction is performed in such a manner that the upper effective level DG2 and the lower effective level dG2 coincide with the a lower reference value LG1 and an upper reference value LG2 of the look-up-table, respectively, so that a fourth histogram HG4 is obtained. Further, in a similar way, regarding the histogram HB3, the upper effective level DB2 and the lower effective level dB2 are obtained. Then, the linear-reversal gradation correction is performed in such a manner that the upper effective level DB2 and the lower effective level dB2 coincide with the a lower reference value LB1 and an upper reference value LB2 of the look-up-table, respectively, so that a fourth histogram HB4 is obtained.

Regarding the R-image, the image data corresponding to the third histogram HR3 is converted to the image data corresponding to the fourth histogram HR4, as follows:

$$R\text{-normalization data}=LR2-(ID-dR2) \times (LR2-LR1)/(DR2-dR2) \quad (1)$$

wherein "ID" is input data, which is image data corresponding to the third histogram HR3, and the R-normalization data is image data corresponding to the fourth histogram HR4.

Similarly, regarding the G-image, the image data corresponding to the third histogram HG3 is converted to the image data corresponding to the fourth histogram HG4, as follows:

$$G\text{-normalization data}=LG2-(ID-dG2) \times (LG2-LG1)/(DG2-dG2) \quad (2)$$

Regarding the B-image, the image data corresponding to the third histogram HB3 is converted to the image data corresponding to the fourth histogram HB4, as follows:

$$B\text{-normalization data}=LB2-(ID-dB2) \times (LB2-LB1)/(DB2-dB2) \quad (3)$$

Thus, in Step 107, regarding the R-, G- and B-image data, the color correction parameters, by which the conversion equations (1), (2) and (3) for performing the linear-reversal gradation corrections are determined, are calculated. The color correction parameters include the offset values, which are the lower effective levels dR2, dG2 and dB2, and the gains, which are (LR2−LR1)/(DR2−dR2), (LG2−LG1)/(DG2−dG2) and (LB2−LB1)/(DB2−dB2).

In Step 108, a pre-scanning operation is performed in accordance with the optimum exposure time obtained in Step 105. In the pre-scanning operation, the film M is set at an initial position in which an end portion of the film M faces the light source 20, and then the image recorded in the film M is read with a pitch, which is coarser than that of a regular scanning operation performed in Step 111. In this reading operation, the light-emitting diodes 21R, 21G and 21B are illuminated in a predetermined order every time the stage 12 is stopped, so that R, G and B image data are detected line by line. Then, the image data are subjected to a correction process using the color correction parameters, and transmitted to the computer 60. Namely, the image data are subjected to the correction process in accordance with the equations (1), (2) and (3). Then, the look-up-table is referred to, so that a gamma correction is carried out on the image data. Thus, the obtained image PI (FIG. 4) is indicated on a part of the surface of the monitor display device 60b, together with various labels and information.

In Step 109, it is determined whether the regular scanning operation is to be started. The user of the image reading device can determine whether the regular scanning operation is to be started, by observing the pre-scanned image PI indicated on the surface of the monitor display device 60b. When a label "MS" of the regular scanning operation, indicated on the surface of the monitor display device 60b of the computer 60, is clicked, the process goes from Step 109 to Step 111, in which the regular scanning operation is performed. The regular scanning operation is basically the same operation as that of the pre-scanning operation, except that the reading pitch of the line sensor 30 is relatively fine in comparison with the pre-scanning operation. Namely, the image data read by the regular scanning operation is subjected to the correction processes according to the equations (1), (2) and (3), and the gamma corrections. Then, the corrected image is indicated on a surface of the monitor display device 60b. When the regular scanning operation ends, Step 109 is again executed.

Conversely, when the label "MS" of the regular scanning operation is not clicked, Step 110 is executed, in which it is determined whether the pre-scanning operation is again to be performed. When the label "MP" of the pre-scanning operation is clicked, the process goes to Step 120, in which a parameter check routine for a simple trimming operation is executed. Then, the process goes back to Step 107. Conversely, when the label "MP" is not clicked, the process goes back to Step 109. Namely, while neither of the labels "MS" nor "MP" is clicked, Steps 109 and 110 are repeatedly executed.

Note that, if a label "ME", which is indicated on the surface of the monitor display device 60b to imply an ejecting operation, is clicked, the image reading routine ends due to an interruption operation, and the film M is ejected from the image reading device.

Figure 7:
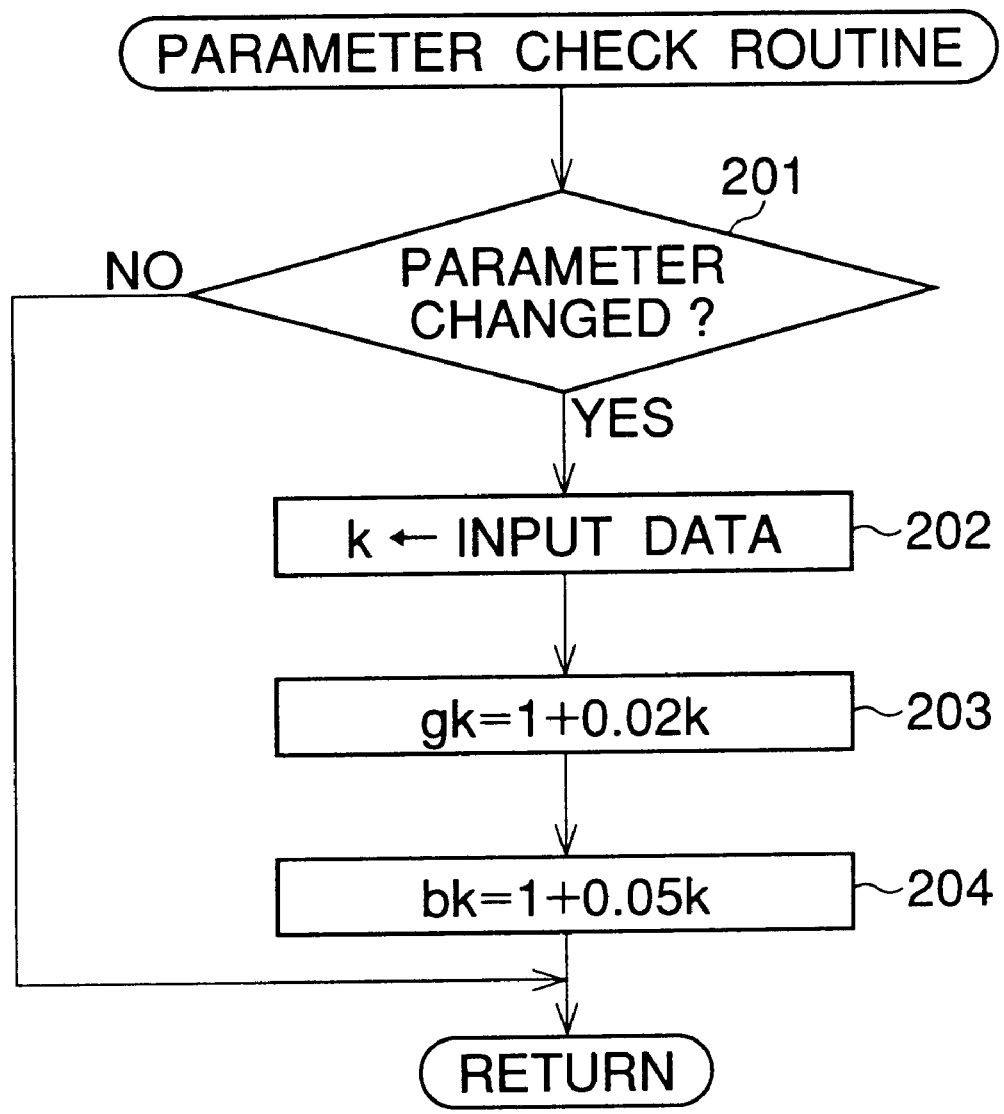
FIG. 7 is a flowchart of an example of a subroutine, which is executed in Step 120 of FIG. 3.
Figure 8:
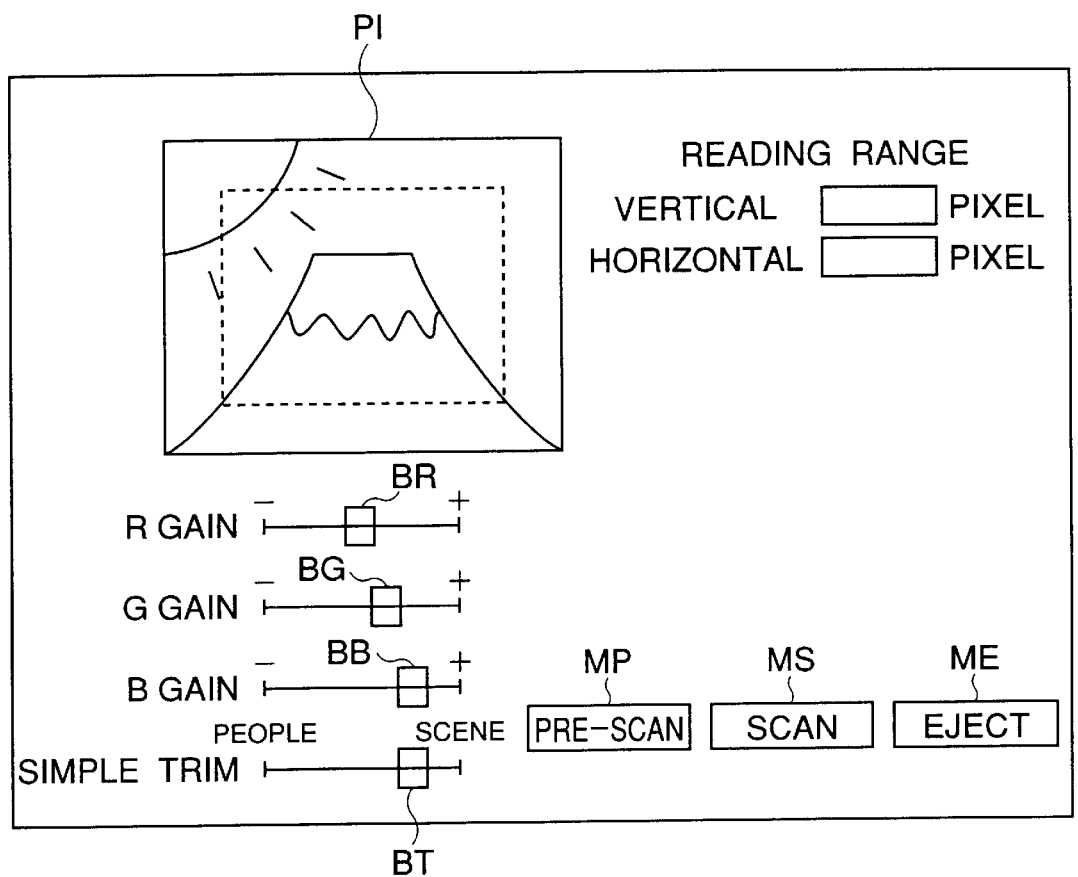
FIG. 8 is a view showing a first example of an indicated arrangement on a surface of the display device of the computer, in a simple trimming operation.
Figure 9:
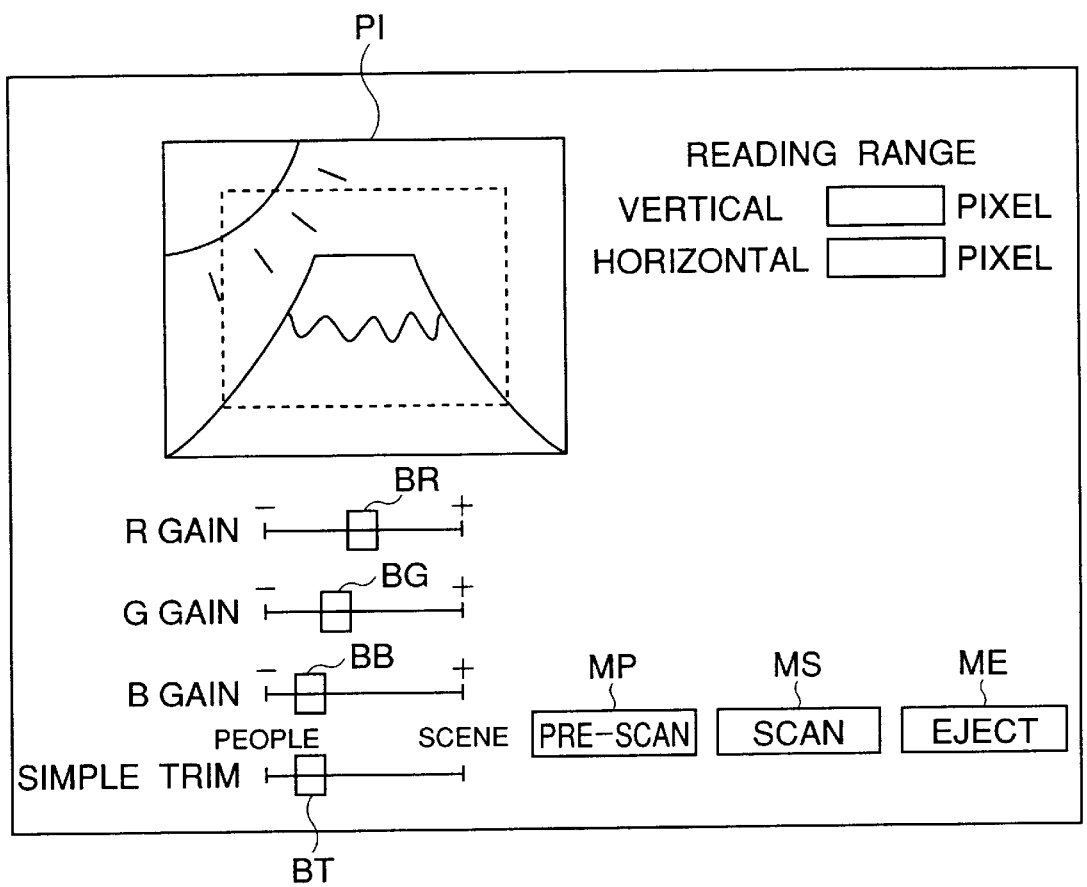
FIG. 9 is a view showing a second example of an indicated arrangement on a surface of the display device of the computer, in the simple trimming operation.

FIG. 7 is a flowchart of an example of a subroutine, which is executed in Step 120 of FIG. 3, and in which parameters of the simple trimming operation are checked. FIGS. 8 and 9 show examples of indicated arrangements on a surface of the monitor display device 60*b* of the computer 60, in the simple trimming operation.

The simple trimming operation is carried out by a user usually while Steps 107 through 111 are executed. The simple trimming operation is a simple method, which is performed by moving a button BT (see FIG. 4) indicated on a surface of the monitor display device 60*b*, to correct a color balance of a color image when the color image read from the film M is indicated on a surface of the monitor display device 60*b* or is printed on a sheet of paper. Due to this operation, the parameter "k" of the simple trimming operation is changed, and in Step 120, the parameter is checked and correction coefficients "gk" and "bk" are calculated.

In Step 201, it is determined whether or not the parameter "k" of the simple trimming operation has been changed. The parameter "k" is set in accordance with a position of the button BT of the simple trimming operation. The position of the button BT is changed by dragging the mouse 60*a* rightward or leftward. When the button BT is set at the right end position, a scene mode is set, and the parameter "k" is set to a maximum value, i.e. 25, for example. When the button BT is set at the left end position, a people mode is set, and the parameter "k" is set to a minimum value, i.e. −25, for example. When the button BT is set at a position between the center and the right end position, for example, the parameter "k" is set at a value between 0 and 25.

In the initial condition, the button BT is positioned at the center of the range, which is indicated by a horizontal line, so that the parameter "k" is equal to 0, as shown in FIG. 4.

In the scene mode, a blue component of the image is emphasized, and in the people mode, the blue component of the image is de-emphasized. Thus, by changing the position of the button BT from the center to right or left, one of a first color balance mode such as the scene mode or a second color balance mode such as the people mode is selected.

When it is determined in Step 201 that the parameter "k" has not been changed, i.e. when the button BT has not been handled, Steps 202 through 204 are skipped, so that this routine ends substantially without execution. Conversely, when it is determined in Step 201 that the parameter "k" has been changed, Step 202 is executed, in which an input value, set via the button BT indicated on the surface of the monitor display device 60*b*, is set to the parameter "k". In Step 203, the correction coefficient "gk" for the green component is obtained according to the following formula:

$$gk = 1 + 0.02k \qquad (4)$$

In Step 204, the correction coefficient "bk" for the blue component is obtained according to the following formula:

$$bk = 1 + 0.05k \qquad (5)$$

Therefore, when the parameter "k" is 10, for example, i.e. when the button BT is set to the side of the scene mode, gk=1.2 and bk=1.5, so that the emphasis of the blue component is increased. Namely, as shown in FIG. 8, in association with a movement of the button BT to the side of the scene mode, a button BG indicating a change in chromaticity of the green component signal (correction coefficient "gk") and a button BB indicating a change in chromaticity of the blue component signal (correction coefficient "bk") are moved in directions in which the values increase, and the movement amount of the button BB is greater than that of the button BG.

Conversely, when the parameter "k" is −10, for example, i.e. when the button BT is set to the side of the people mode, gk=0.8 and bk=0.5, so that the emphasis of the blue component is decreased. Namely, as shown in FIG. 9, in association with a movement of the button BT to the side of the people mode, the button BG indicating a change in chromaticity of the green component signal (correction coefficient "gk") and the button BB indicating a change in chromaticity of the blue component signal (correction coefficient "bk") are moved in directions in which the values decrease, and the movement amount of the button BB is greater than that of the button BG.

As described above, in the scene mode and the people mode, the correction coefficients "gk" and "bk" are increased or decreased by different amounts at the same time, and by moving the button BT of the simple trimming operation, the buttons BG and BB indicating the chromaticity of the green and blue component signals (i.e. gain settings of the green and blue component signals), are moved rightward or leftward in association with each other. Note that a button BR for setting a gain of a red component signal remains stationary irrespective of the movement of the button BT of the simple trimming operation.

On the other hand, in a state in which the buttons BG and BB for setting the gains of the green and blue component signals are displaced by moving the button BT of the simple trimming operation, the user can further move the buttons BG and BB, for green and blue gain settings, independently from the button BT. As a result, the correction coefficients "gk" and "bk", i.e. the color balance of the image, can be minutely or finely adjusted. Additionally, the user can move the button BR for red gain setting independently of the other buttons BT, BB and BG, to perform a similar adjustment as that carried out by independent movement of the buttons BR and BG.

A selection of examples follows explaining various manners by which the correction coefficients "gk" and "bk", obtained by the operations described above, may be utilized in the color balance adjustment of a color image.

In a first example, the calculation result of the equation (2) is multiplied by the correction coefficient "gk", and the calculation result of the equation (3) is multiplied by the correction coefficient "bk". These calculations are executed in Steps 108 and 111 of the flowchart shown in FIG. 3.

In a second example, the upper reference value is corrected according to the following equations (6) and (7):

$$LG2' = LG2 + (gk - 1) \times H \qquad (6)$$

$$LB2' = LB2 + (bk - 1) \times H \qquad (7)$$

wherein "H" is a predetermined coefficient. These calculations are executed in Step 107.

In a third example, the output values from the look-up-table are multiplied by the respective correction coefficients "gk" and "bk". These calculations are executed in Steps 108 and 111.

In the case of a positive film, as a fourth example, the values of the exposure times for the green and blue components may be multiplied by the correction coefficients "gk" and "bk", respectively. These calculations are executed in Steps 108 and 111.

As described above, according to the embodiment, by a simple operation in which the button BT indicated on the surface of the monitor display device 60*b* is moved, the color balance of the image indicated on the surface is adjusted. Namely, an operation, in which a color image having a desired color tone is obtained, becomes easy due to the embodiment.

Figure 10:
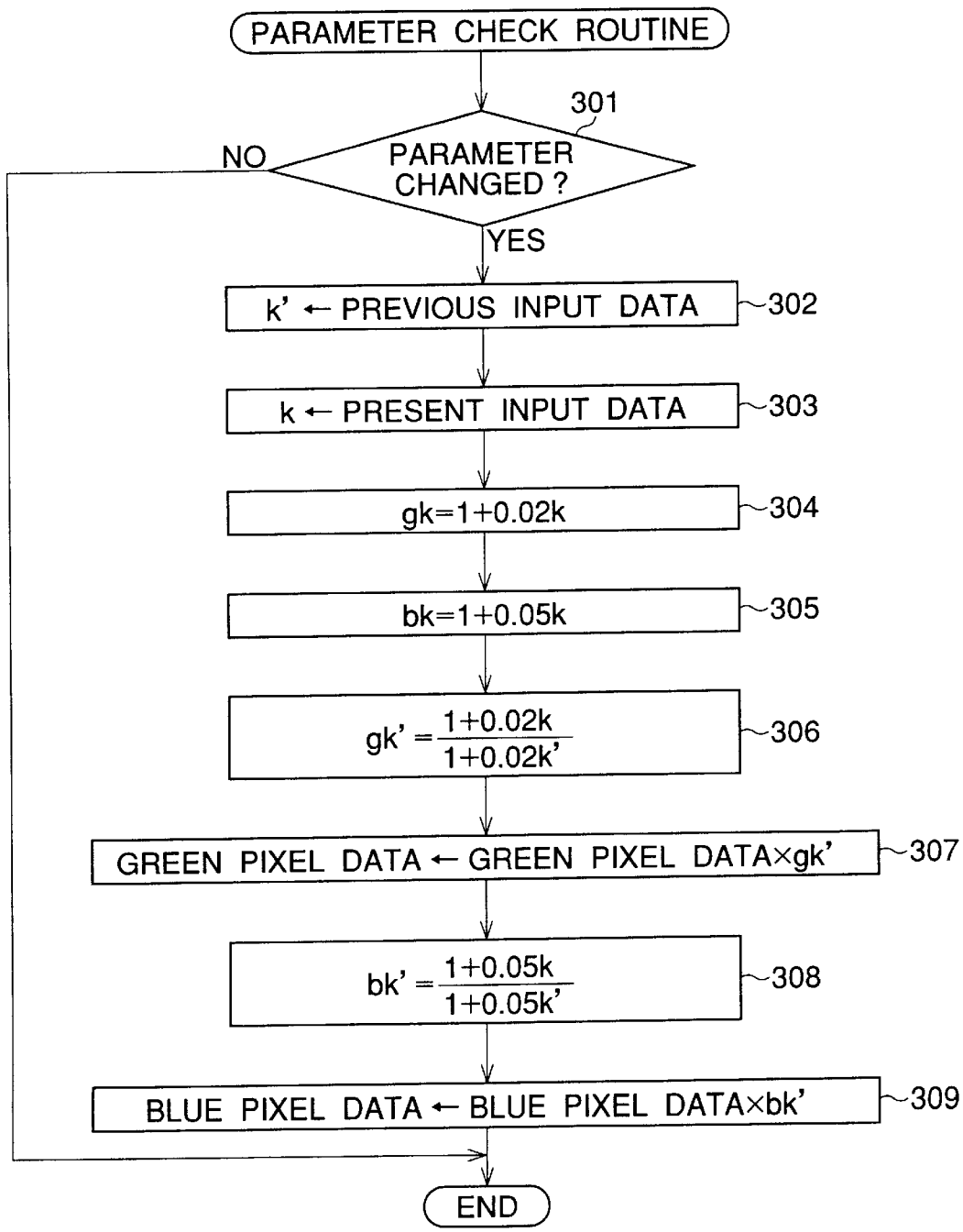
FIG. 10 is a flowchart of a second example of a program executing the simple trimming operation.

FIG. 10 shows a flowchart of an example of a program for executing the simple trimming operation. According to this simple trimming operation, subsequent to performing the pre-scanning operation or the regular scanning operation a first time, a color image, a color balance of which is adjustable, can be indicated on a surface of the monitor display device without requiring a re-execution of the pre-scanning operation or the regular scanning operation. Therefore, when the program of the simple trimming operation shown in FIG. 10 is used, the program of the simple trimming operation is interruptably-executed at a constant time interval after the once-only execution of the pre-scanning operation or the regular scanning operation, so that the image, a color balance of which has been changed, is indicated in real time.

In Step 301, it is determined whether the parameter "k" of the simple trimming operation has been changed. When it is determined in Step 301 that the parameter "k" has not been changed, Steps 302 through 309 are skipped, and thus, this program ends substantially without execution.

Conversely, when it is determined in Step 301 that the parameter "k" has been changed, Step 302 is executed, in which an input value, set by the button BT in the previous operation, is set to the parameter "k'". When Step 302 is executed for the first time, the parameter "k'" is 0. In Step 303, an input value, set by the button BT in the present operation, is set to the parameter "k". In Step 304, the correction coefficient "gk" for a green component signal is obtained according to the equation (4), and in Step 305, the correction coefficient "bk" for a blue component signal is obtained according to the equation (5).

In Step 305, the change rate "gk'" is obtained by the following equation:

$$gk' = (1+0.02k)/(1+0.02k') \qquad (8)$$

Namely, the change rate "gk'" is a ratio of the correction coefficient "gk" for a green component signal in the present operation to the correction coefficient "gk" for a green component signal in the previous operation.

In Step 307, pixel data of the green component are then multiplied by the change ratio "gk'". In Step 308, the change rate "bk'" is obtained by the following equation:

$$bk' = (1+0.05k)/(1+0.05k') \qquad (9)$$

Namely, the change rate "bk'" is a ratio of the correction coefficient "bk" for a blue component signal in the present operation to the correction coefficient "bk" for a blue component signal in the previous operation. In Step 309, pixel data of the blue component are multiplied by the change ratio "bk'".

As described above, the pixel data generated in Steps 307 and 309 are obtained by multiplying the pixel data of the image, which has been indicated on a surface of the monitor display device, by the change ratios "gk'" and "bk'" of the correction coefficients "gk" and "bk". Therefore, on the surface of the monitor display device 60b, the image, the color balance of which is real-time adjustable by moving the button BT, is indicated.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 9-170970 (filed on Jun. 12, 1997) which is expressly incorporated herein, by reference, in its entirety.

I claim:

1. A color balance adjusting device, by which a color balance of a color image, which is obtained by combining at least a first color component signal, a second color component signal, and a third color component signal, is adjusted, said device comprising:

a color component adjusting processor that adjusts a chromaticity of each of said first and second color component signals;

a control processor that controls said color component adjusting processor in one of a first color balance mode, in which said chromaticity of said first color component signal and said second color component signal are increased while maintaining said chromaticity of said third color component signal, and a second color balance mode, in which said chromaticity of said first color component signal and said second color component signal are decreased while maintaining said chromaticity of said third color component signal;

an image indicating processor that indicates a second color image obtained by synthesizing said first and second color component signals, which arc adjusted by said color component adjusting processor, together with said third color component signal, which remains unadjusted;

a parameter setting processor that sets a parameter, and a correction coefficient calculating processor that obtains a first correction coefficient corresponding to said first color component signal and a second correction coefficient corresponding to said second color component signal based on said parameter, said control processor controlling said color component adjusting processor in accordance with said first correction coefficient and said second correction coefficient.

2. A device according to claim 1, wherein each of said first and second color component signals is one of a red component signal, a green component signal and a blue component signal.

3. A device according to claim 2, wherein said first color component signal is said blue component signal and said second color component signal is said green component signal.

4. A device according to claim 1, wherein, in said first and second color balance modes, said chromaticity of said first color component signal and said chromaticity of said second color component signal are simultaneously changed by different amounts.

5. A device according to claim 1, wherein said control processor controls said color component adjusting processor to operate repeatedly.

6. A device according to claim 5, further comprising a change ratio calculating processor that calculates a first change ratio being a ratio between said first correction coefficient, which is obtained when said control processor firstly controls said color component adjusting processor, and another first correction coefficient, which is obtained when said control processor secondly controls said color component adjusting processor, and a second change ratio being a ratio between said second correction coefficient, which is obtained when said control processor firstly controls said color component adjusting processor, and another second correction coefficient, which is obtained when said control processor secondly controls said color component adjusting processor, said control processor controlling said color component adjusting processor, in accordance with said first change ratio and said second change ratio.

7. A device according to claim 1, further comprising an additional adjusting processor that adjusts said chromaticity of each of said first and second color component signals, after said control processor controls said color component adjusting processor.

8. A device according to claim 1, further comprising a display device by which a color image, a color balance of which has been adjusted by said color component adjusting processor, is indicated.

9. A device according to claim 8, wherein one of said first and second color balance modes is selected by manipulating an indication on a surface of said display device.

10. A device according to claim 9, further comprising an indication processor that indicates on said surface of said display device a degree of change of each of said first and second color component signals, which is adjusted by said color component adjusting processor, in association with a selecting operation of said first and second color balance modes by said control processor.

11. The color balancing device according to claim 1, wherein in said first color balance mode, said chromaticity of said first color component signal is always increased more than said chromaticity of said second color component signal, and in said second color balance mode, said chromaticity of said first color component signal is always decreased more than said chromaticity of said second color component signal.

12. A color balance adjusting device, by which a color balance of a color image, which is obtained by synthesizing together a blue component signal, a green component signal, and red component signal, is adjusted, said device comprising:

a selection processor that selects one of a first color balance mode, in which a chromaticity of said blue and green component signals are emphasized and a chromaticity of said red component signal is maintained so that said red component signal is de-emphasized, and a second color balance mode in which a chromaticity of said blue and green component signals are de-emphasized and said chromaticity of said red component signal is maintained so that said red component signal is emphasized, a color component adjusting processor that adjusts a chromaticity of each of said blue and green component signals; and a control processor that controls said color component adjusting processor according to said first color balance mode by increasing said chromaticity of said blue and said green component signals while maintaining said chromaticity of said red component signal, and said second color balance mode by decreasing said chromaticity of said blue and said green while maintaining said chromaticity of said red component signal;

an image indicating processor that indicates a second color image obtained by synthesizing said blue and green component signals, which are adjusted by said color component adjusting processor, together with said red component signal, which remains unadjusted, a parameter setting processor that sets a parameter; and a correction coefficient calculating processor that obtains a first correction coefficient corresponding to said blue color component signal and a second correction coefficient corresponding to said green color component signal based on said parameter, said control processor controlling said color component adjusting processor in accordance with said first correction coefficient and said second correction coefficient.

13. The color balancing device according to claim 12, wherein in said first color balance mode, said chromaticity of said blue component signal is always increased more than said chromaticity of said green component signal, and in said second color balance mode, said chromaticity of said blue component signal is always decreased more than said chromaticity of said green component signal.

14. The color balancing device according to claim 13, wherein in said first color balance mode, said chromaticity of said first color component signal is always increased more than said chromaticity of said second color component signal, and in said second color balance mode, said chromaticity of said first color component signal is always decreased more than said chromaticity of said second color component signal.

15. An image reading device, comprising;

an optical sensor that senses a first color image to output first, second, and third color component signals;

a color component adjusting processor that adjusts a chromaticity of each of said first color component signal, and said second color component signal;

said color component adjusting processor selecting one of a first color balance mode, in which said chromaticity of said first color component signal and said second color component signal are increased while maintaining said chromaticity of said third color component signal, and a second color balance mode, in which said chromaticity of said first color component signal and said second color component signal are decreased while maintaining said chromaticity of said third color component signal;

an image indicating processor that indicates a second color image obtained by synthesizing said first and second color component signals, which are adjusted by said color component adjusting processor, together with said third color component signal, which remains unadjusted, a parameter setting processor that sets a parameter;

a correction coefficient calculating processor that obtains a first correction coefficient corresponding to said first color component signal and a second correction coefficient corresponding to said second color component signal based on said parameter; and a control processor that controls said color component adjusting processor in accordance with said first correction coefficient and said second correction coefficient.

\* \* \* \* \*